J. W. HOMER.
TROLLEY WHEEL.
APPLICATION FILED JUNE 9, 1913.

1,110,783.

Patented Sept. 15, 1914.
2 SHEETS—SHEET 1.

Witnesses:
R. S. Trogner
W. H. Wakefield

Inventor:
J. W. Homer
By Mason Fenwick & Lawrence
Attys.

J. W. HOMER.
TROLLEY WHEEL.
APPLICATION FILED JUNE 9, 1913.

1,110,783.

Patented Sept. 15, 1914
2 SHEETS—SHEET 2.

Witnesses:
R. S. Trogner.
W. H. Wakefield

Inventor:
J. W. Homer

By Mason, Fenwick & Lawrence
Attys.

UNITED STATES PATENT OFFICE.

JOHN WILTSHIRE HOMER, OF GREENCASTLE, PENNSYLVANIA.

TROLLEY-WHEEL.

1,110,783. Specification of Letters Patent. Patented Sept. 15, 1914.

Application filed June 9, 1913. Serial No. 772,672.

*To all whom it may concern:*

Be it known that I, JOHN WILTSHIRE HOMER, citizen of the United States, residing at Greencastle, in the county of Franklin and State of Pennsylvania, have invented certain new and useful Improvements in Trolley Wheels; and I do hereby declare the following to be a full, clear, and exact description of the invention, such as will enable others skilled in the art to which it appertains to make and use the same.

This invention relates to improvements in trolley wheels, and the object of the invention is to provide a trolley wheel which will not slip off of the trolley wire as the car is rounding a curve.

A further object of the invention is to provide a trolley wheel construction wherein two points of contact are made constantly with the wire so as to afford a greater surface of contact and also to prevent the sparking due to self induction of the motors of railway cars when the trolley passes from one booster section to another booster section.

A further object of the invention is to provide a trolley wheel carrier of the general construction outlined wherein additional contacting means are always insured between the trolley pole and the frame carrying the trolley wheels.

A still further object of the invention is to provide a construction of the general kind already mentioned having two trolley wheels mounted in such a way that when the wheels jump the trolley wire, the first contact with the ordinary guy wires used in the suspending of trolley wires, will throw the wheels in a position where they will not be able to engage the next guy wires, so that there is no danger of breaking of the guy wires used in supporting trolley wires when trolley wheels of my construction are used.

With these and other objects in view, the invention consists in certain novel constructions, arrangements and combinations of the parts which I shall hereinafter fully describe and claim.

Figure 1:
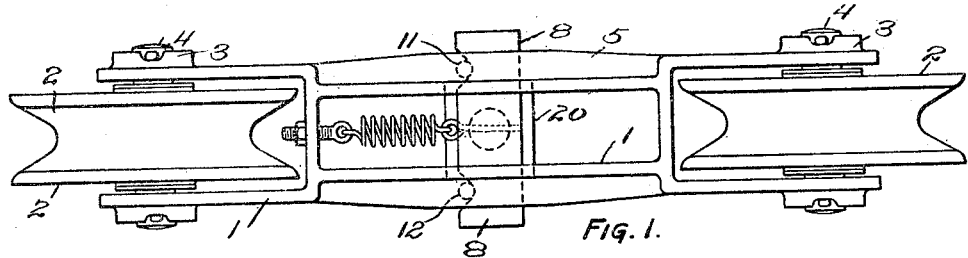
Figure 2:
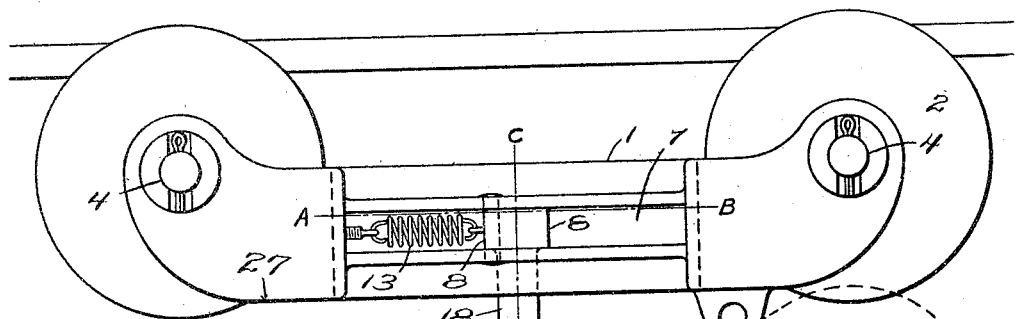
Figure 3:
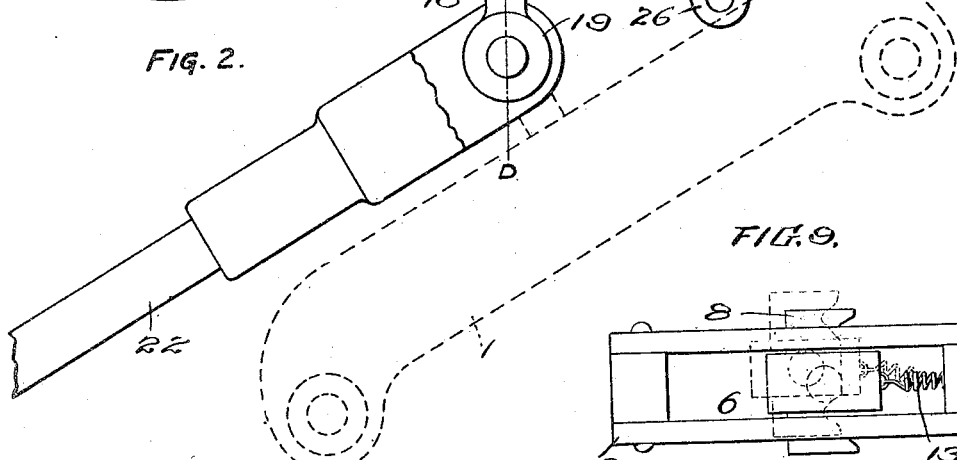
Figure 9:
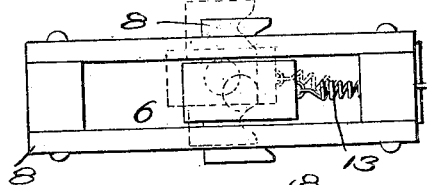
Figure 4:
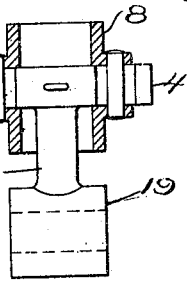
Figure 5:
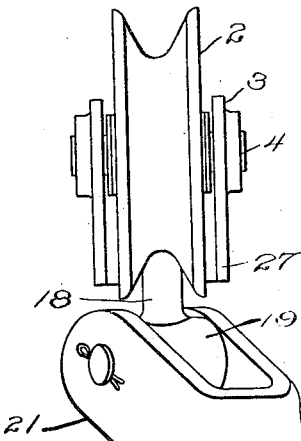
Figure 6:
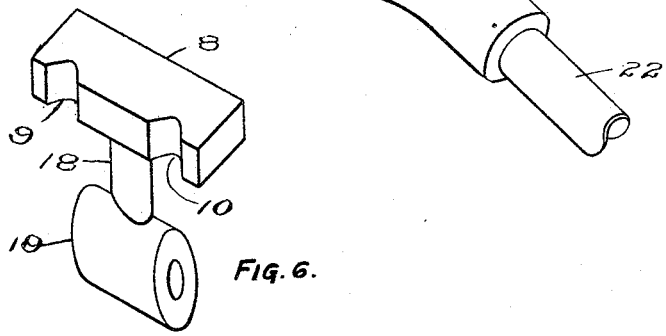
Figure 7:
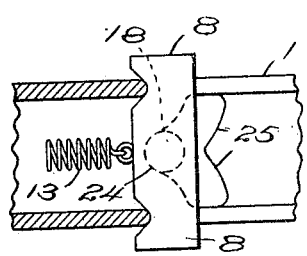
Figure 8:
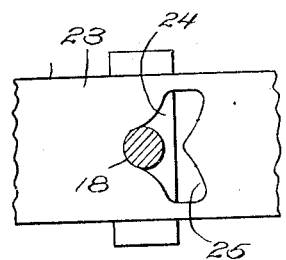

In the accompanying drawings wherein similar reference characters designate corresponding parts, and wherein two of the several forms of which the invention is capable, are illustrated: Figure 1 is a top plan view of the invention; Fig. 2 is a side elevation of the invention as applied to an ordinary trolley pole, the position which the body carrying the trolley wheels assumes after the trolley wheel has jumped the wire and has engaged the first guy wire, being shown in dotted lines; Fig. 3 is a horizontal section on line A—B of Fig. 2, taken after the car has rounded a curve in the track, but before the trolley has assumed its new position; Fig. 4 is a vertical section taken on the line c—d of Fig. 2; Fig. 5 is a front elevation of the invention as shown in section in Fig. 3; Fig. 6 is a perspective view of the detail member used in the invention; Fig. 7 is a fragmentary top plan view, partly in section, showing a modified form of the invention; Fig. 8 is a bottom plan view of the structure shown in Fig. 7; and Fig. 9 is a reduced view showing parts of the invention in a position in dotted lines which may be assumed by accident.

The general aim of this invention is to provide a body each end of which is provided with a trolley wheel, while the central portion is provided with a slot within which slides a T-shaped block adapted to engage pivot members formed on opposite sides of the block, said T-shaped member being carried by the trolley pole and being constrained to move toward the pivot points by means of a spring.

Referring to the drawings, particularly the first six figures wherein the preferred form of the invention is shown, it will be seen that the invention comprises a frame 1 made of pressed steel or other suitable material, said frame having mounted in each end thereof, a trolley wheel 2 which is of the usual construction and forms no part of the present invention. The ends of the frame 1 are provided with journals 3 which receive pins 4, upon which are mounted the trolley wheels 2. I am aware that it has been proposed heretofore, to provide a construction somewhat similar to the construction already described, and I make no claim to the general combination of wheels and frame.

The central portion of the frame is provided with L-shaped strips 5 which connect the opposite ends of the member 1, although of course other forms of bars 5 could be used to accomplish the same results attained by the L-shaped members shown in the drawings. Four of these bars 5 are shown, and are arranged, as shown in Fig. 4, to provide a vertical slot 6 and a horizontal slot 7, the bars 5 forming tracks adapted to receive and guide the block to be described hereinafter.

Mounted on the slide between the bars, is a block 8 which is shown in Fig. 3 as substantially rectangular in cross section, but has one of its long surfaces thereof provided with recesses 9 and 10 which are adapted to press against the pivot members 11 and 12 carried by the body 1. These pivot members as shown in the drawings, comprise rods passing vertically between the bars 5, although it is obvious that other means may be resorted to for the purpose of providing pivots against which the block 8 may be drawn by a suitable tension spring 13. This spring 13 is connected by means of an eye or other suitable means 14 to the block 8, and has secured thereto a threaded bolt 15 which carries a nut 16 adapted to press against walls 17 formed in the body 1. By means of the bolt 15 and nut 16, it is possible to adjust the tension of the spring 13 so that the block 8 may be forced against the pivot points 11 and 12, as tightly as may be desired. Rigid with the block 8 is a shank 18, the lower end of which is enlarged to form a hub 19 which is received between the arms 20 of the usual harp 21 secured to the trolley pole 22. Thus it will be seen that the block 8 is required to move with the trolley pole 22, and insomuch as the latter moves with the car, it will be apparent that when the car turns a curve, the block 8 will assume a position shown in Fig. 3, where it will be noted that the length of the block 8 is substantially at right angles to the trolley pole 22.

In the operation of the preferred form of the invention, when a car turns a curve, the block 8 will turn also, the turning being made around one of the pivot points, the pivot point 11 being shown for this purpose in Fig. 3. As the block turns, it will be seen that the spring 13 is put under tension so that there is a natural effort made by the spring to force the pin 11 around to a position parallel to the direction of travel of the car. As soon therefore, as the forward trolley wheel reaches a switch in the trolley wire, the spring will move the body 1 so as to guide the trolley wheel to the correct trolley wire insomuch as the pin 11 is rigid with the body. It will be seen that at all times there is intimate contact between the block 8 and one of the pivots 11 and 12, and insomuch as the pivots 11 and 12 are rigid, there is some wearing between the surface of said pivots and the bottoms of the recesses formed in the block 8 so that a good contact is insured. The recesses 9 and 10 are made of such a width that the part of the block 8 lying between the inner edges of said recesses will be narrow enough not to engage one of the pivot points 11 and 12 should the block be slid aside accidentally as shown in Fig. 9. It is necessary of course in order to produce this result, to have the shank 18 of the proper thickness.

The modified form of the invention as shown in Figs. 7 and 8, is adapted to embrace the preferred form, but has added thereto a plate 23 which is secured to the lower bars 5 and extends between the ends of the body 1. This plate 23 is provided with two arcuate slots which meet at a common point to form a cusp, the centers of the arcuate slots 24 and 25 being the pivotal points 11 and 12 respectively. It will be seen by this construction that as the block 8 swings about one of the pivots, the shank 18 will swing in the corresponding slot, and thereby insure a more steady motion of said block 8.

The rear end of the body portion 1 is provided with a perforated depending lug 26 to which may be attached suitable trolley rope not shown, while the lower side 27 of the forward end of the body 1 is almost tangent to the forward trolley wheel. By this construction it will be seen that when the body 1 is moved to the position shown in dotted lines in Fig. 2, any of the guy wires which are commonly used for the suspension of the trolley wire will slide over the trolley pole an harp, and over the surface 27 and the wheel without being caught so that the likelihood of breaking said supporting guy wires, is reduced to a minimum. The position shown in dotted lines in Fig. 2, will be assumed by the trolley wheel supporting body 1 when the latter engages the first of the guy wires supporting the trolley wires after the trolley has jumped the wire.

The hub 19 is made to correspond in dimensions with the hub of the usual trolley wheel so that the present device may be inserted in the ordinary trolley poles without altering the same, and the hub is supported in a manner to admit of the swinging of the trolley wheels as just described. If desired, the means for securing the inner end of the spring 13 to the block 8, may comprise an eye bolt which passes through the block and serves to lock the shank 18 to the block as well as afford a support for the inner end of the spring.

What I claim is:

1. A current collecting device comprising a body portion, a pair of trolley wheels mounted upon said body portion, a block moving with the trolley pole adapted to engage the body portion at two points when the pole and body portion are in alinement, and means interposed between the block and body portion for alining the body portion with the trolley pole.

2. A current collecting device, comprising a body portion provided with a pair of trolley wheels, a pivot block secured to the trolley pole and adapted to engage one of two points of the body portion as the pole turns and to engage both points when the pole and body portion are in alinement, and means interposed between the block and body portion for alining the body portion with the trolley pole.

3. A current collecting device comprising a body portion provided with a pair of trolley wheels, a block moving with the trolley pole provided with a pair of fulcrums, a pair of pivot points formed on the body portion both of which are adapted to be engaged by the fulcrums of the block when the pole and body portion are in alinement, and means interposed between the block and body portion adapted to move the body portion in alinement with the trolley pole.

4. A current collecting device comprising a hollow body portion provided with a trolley wheel on each end thereof, a block guided within the hollow portion and adapted to move with the trolley pole, and means interposed between the block and body portion adapted to turn the body portion in alinement with the trolley pole.

5. A current collecting device comprising a hollow body portion and provided with trolley wheels on each end thereof, a block provided with a pair of fulcrums slidably mounted and guided within the hollow portion of the body, a pair of pivots carried by the body portion adapted to engage the fulcrums of the block when the pole and body portion are in alinement, and means interposed between the pole and body portion adapted to aline the body with the trolley pole, the block being secured to the trolley pole.

6. A current collecting device comprising a hollow body portion and provided with a trolley wheel on each end thereof, pivot members formed on the sides of the body portion, a block provided with fulcrums adapted to engage the pivot points and moving with the trolley pole, and resilient means connecting a point intermediate of the two fulcrums and the body portion.

7. A current collecting device comprising a hollow body portion and provided with trolley wheels on each end thereof, pivot members formed in the sides of the body portion, a block adapted to move with the trolley pole and provided with V-shaped recesses adapted to engage the pivot members, resilient means connected to the body portion and a point on the block intermediate the recesses, and means preventing the pivot members from engaging the portion of the block intermediate the recesses.

8. A current collecting device comprising a hollow body portion carrying a wheel on each end thereof, pivot members formed in the sides of the body portion, a block pivotally mounted to a trolley pole and adapted to move therewith, said block being provided with fulcrums adapted to engage the pivot members of the body, and resilient means interposed between the body portion and the block.

9. A current collecting device comprising a hollow body portion and provided with a trolley wheel on each end, a block located within the hollow portion of the body and adapted to move with a trolley pole, pivot members formed on the body portion, fulcrums formed on the block adapted to engage the pivot members, the body portion being provided with intersecting slots concentric with the pivot members, said slots adapted to guide the block, and resilient means interposed between the body portion and block adapted to hold the fulcrums on the block against the pivot members of the body portion.

10. A current collecting device comprising a hollow body portion provided with a wheel on each end thereof, a block located within the hollow portion of the body and provided with fulcrums, pivot members formed on the body portion adapted to engage the fulcrums, arcuate slots concentric with the pivot members formed in the body portion, a shank depending from the block and adapted to pass through the slots and be guided thereby, means for connecting said shank to a trolley pole and resilient means interposed between the body portion and the block.

11. A current collecting device comprising a hollow body portion provided with a wheel on each end thereof, a sliding block located within the hollow portion of the body, pivot members formed on the body portion adapted to engage the block when the pole and body portions are in alinement, arcuate slots concentric with the pivot members formed in the body portion, a shank depending from the block and adapted to pass through the slots and be guided thereby, means for connecting said shank to the trolley pole and resilient means interposed between the body portion and the block for alining the body portion with the trolley pole.

12. A current collecting device comprising a body portion carrying one or more current collecting members, a block carrying the body portion slidably engaging the same and pivotally connected to the trolley pole to rotate in the vertical plane of the trolley pole, and resilient means interposed between the block and body portion adapted to hold the block against the body portion.

In testimony whereof I affix my signature in presence of two witnesses.

JOHN WILTSHIRE HOMER.

Witnesses:
  CHAS. J. ZULLINGER,
  CHAS. M. WOOD.

---

Copies of this patent may be obtained for five cents each, by addressing the "Commissioner of Patents, Washington, D. C."